(12) United States Patent
Arnaout et al.

(10) Patent No.: US 6,711,520 B2
(45) Date of Patent: Mar. 23, 2004

(54) REMOTE EXECUTION OF DIAGNOSTIC FIRMWARE IN A BLOCK DATA STORAGE DEVICE

(75) Inventors: Badih M. Arnaout, Loveland, CO (US); Michael G. Magill, Olathe, CO (US); Wilson M. Fish, Yukon, OK (US)

(73) Assignee: Seagate Technology LLC, Scotts Valley, CA (US)

( * ) Notice: Subject to any disclaimer, the term of this patent is extended or adjusted under 35 U.S.C. 154(b) by 46 days.

(21) Appl. No.: 10/127,245

(22) Filed: Apr. 22, 2002

(65) Prior Publication Data

US 2003/0014207 A1 Jan. 16, 2003

Related U.S. Application Data

(60) Provisional application No. 60/305,290, filed on Jul. 12, 2001.

(51) Int. Cl.[7] ............................. G01R 27/28; G06F 15/16
(52) U.S. Cl. ...................... 702/119; 709/211; 709/217
(58) Field of Search ........................... 702/119, 120, 702/122, 186; 709/200, 212, 211, 213, 217, 250, 216, 218

(56) References Cited

U.S. PATENT DOCUMENTS

| 5,680,547 A | * | 10/1997 | Chang ..................... 709/222 |
| 5,903,626 A | | 5/1999 | Iglehart et al. |
| 5,966,428 A | | 10/1999 | Ortiz Perez et al. |
| 6,041,287 A | | 3/2000 | Dister et al. |
| 6,085,244 A | | 7/2000 | Wookey |
| 6,175,934 B1 | | 1/2001 | Hershey et al. |
| 6,253,163 B1 | | 6/2001 | Lapie |
| 6,325,540 B1 | | 12/2001 | Lounsberry et al. |
| 6,351,828 B1 | | 2/2002 | Frimodig et al. |
| 6,362,730 B2 | | 3/2002 | Razavi et al. |

\* cited by examiner

Primary Examiner—John Barlow
Assistant Examiner—Meagan S. Walling
(74) Attorney, Agent, or Firm—Fellers, Snider et al.

(57) ABSTRACT

Method and apparatus for accessing a block data storage device through a computer network to carry out remote diagnostic operations. The data storage device includes a data storage medium, a host interface port, a serial communication (COM) port and a programmable controller with associated platform firmware and associated diagnostic firmware. A client computer and a server computer are connected to a computer network, and the data storage device is connected to the server computer via the host interface port. The server computer is used to transmit a first command to cause the controller to execute the platform firmware, while the client computer is used to transmit a second command to the COM port of the data storage device to cause the controller to concurrently execute the diagnostic firmware to monitor operation of the platform firmware.

25 Claims, 11 Drawing Sheets

REMOTE EXECUTION OF DIAGNOSTIC FIRMWARE IN A BLOCK DATA STORAGE DEVICE

RELATED APPLICATIONS

This application claims priority to U.S. Provisional Application No. 60/305,290 filed Jul. 12, 2001.

FIELD OF THE INVENTION

The claimed invention relates generally to the field of digital data storage and more particularly, but not by way of limitation, to an apparatus and method for remote execution of diagnostic firmware in a block data storage device over a computer network, such as the Internet.

BACKGROUND

Block data storage devices store and/or retrieve digital data in the form of blocks, which are individually addressable by a host device. Exemplary block data storage devices include hard disc drives, optical disc recorders and players, and magnetic digital tape recorders and players.

Such devices typically comprise a hardware/firmware based interface circuit, a communication channel and a recordable medium. The interface circuit includes a buffer for the temporary storage of transferred data and a programmable controller that provides top level control of the device. The user memory space of the recording medium is divided into a number of addressable blocks which are assigned host-level addresses (sometimes referred to as logical block addresses or LBAs). Each LBA typically has a corresponding physical block address (PBA) used by servo control circuitry to align a data transducing head with the appropriate portion of the medium to access the desired LBA.

To write data to the medium, the host device issues a write command comprising the user data to be stored by the storage device along with a list of LBAs to which the user data are to be stored. The storage device temporarily stores the user data in the buffer, schedules movement of the data transducing head to the appropriate location(s) over the medium, and then uses write channel portions of the communication channel to apply the appropriate encoding and conditioning of the data to write the data to the selected LBAs.

To subsequently read the data from the storage device, the host device issues a read command identifying the LBAs from which data are to be retrieved. The storage device schedules movement of the data transducing head to the appropriate location(s) over the medium, and then uses read channel portions of the communication channel to decode readback data which are placed into the buffer for subsequent transfer back to the host device. Such host-device data transfers are typically accomplished through a host interface port configured in accordance with an industry standard protocol such as ATA, SCSI, etc.

The controller uses operational programming ("platform firmware") to manage the overall operation of the device. The platform firmware is typically stored in an integrated circuit memory device accessible by the controller during operation. The memory device further typically stores diagnostic firmware comprising programming that allows a user to monitor the operation of the platform firmware and diagnose error conditions. The diagnostic firmware is often configured to be accessed though a separate communications (COM) port using a serial connection to the device.

In the past, diagnostic evaluation of a device (such as during design or manufacturing) has typically required connecting the device directly to a host computer and installing special communication software on the host computer that allows the user to access the COM port and execute the diagnostic firmware. Limitations associated with this approach include the fact that in today's environment device manufacturers can have manufacturing and design facilities scattered throughout the world. Thus, if the expertise required to diagnose a particular device condition is at a different location than the device, it is necessary to either ship the device to another location or require an engineer or other personnel to travel to the site at which the device is located in order to observe the operation of the device in the environment in which the error condition has occurred.

Similar concerns are also encountered when error conditions are exhibited with devices at customer sites. Field technical personnel are often required to visit the customer site and bring the necessary equipment to observe and evaluate the device, interrupting the customer's operations and delaying the restoration of service to the customer.

As the time windows available to bring new generations of devices to market continue to decrease and as customer expectations for high device availability continue to increase, there is a continual need for improvements in the art to allow users to quickly and accurately diagnose error conditions associated with data storage devices.

SUMMARY OF THE INVENTION

In accordance with preferred embodiments, a block data storage device such as a disc drive is configured to include a data storage medium, a host interface port, a serial communication (COM) port and a programmable controller with associated platform firmware and associated diagnostic firmware.

Generally, the data storage device is remotely accessed by carrying out steps including connecting a client computer and a server computer through a computer network; locally connecting the data storage device to the server computer via the host interface port; using the server computer to transmit a first command to the data storage device through the host interface port to cause the controller to execute the platform firmware; and using the client computer to transmit a second command to the COM port of the data storage device to cause the controller to concurrently execute the diagnostic firmware. The computer network preferably comprises the Internet and communications are preferably carried out using an appropriate communications protocol, such as TCP/IP.

In a preferred embodiment, returned data are transmitted from the COM port of the data storage device to the client computer through the computer network in response to the execution of the diagnostic firmware. The returned data can include information relating to the concurrent execution of the platform firmware.

The COM port can be accessed through a main host interface cable between the server computer and the data storage device, but is preferably accessed using a separate serial interface cable so that the second command is transmitted via the serial interface cable. The diagnostic firmware preferably includes an executable program which is executed by the controller in response to the second command (such as a program that monitors operation of the platform firmware). The second command can also comprise a command to replace existing platform firmware with a new, updated version of platform firmware.

In a preferred approach, appropriate command translation and reporting software having a diagnostic module is loaded onto the server computer and executed to generate the second command in response to a request from the client computer. In this way, the data storage device can be provided with substantially conventional diagnostic routines which are executed remotely by the client computer.

In an alternative preferred approach, the data storage device is configured as a server so that the diagnostic firmware comprises a file system comprising at least one Hypertext Transfer Protocol (HTTP) web page, and wherein the execution of the second command results in display of the at least one HTTP web page on the client computer. In this way, the server PC receives and forwards the requests from the client computer to the data storage device in a file format which is then parsed and executed directly by the diagnostic firmware of the data storage device.

These and various other features and advantages that characterize the claimed invention will be apparent upon reading the following detailed description and upon review of the associated drawings.

BRIEF DESCRIPTION OF THE DRAWINGS

FIG. 6 represents a display viewable on the client computer of FIG. 3 using the software of FIG. 4.

DETAILED DESCRIPTION

Figure 1:
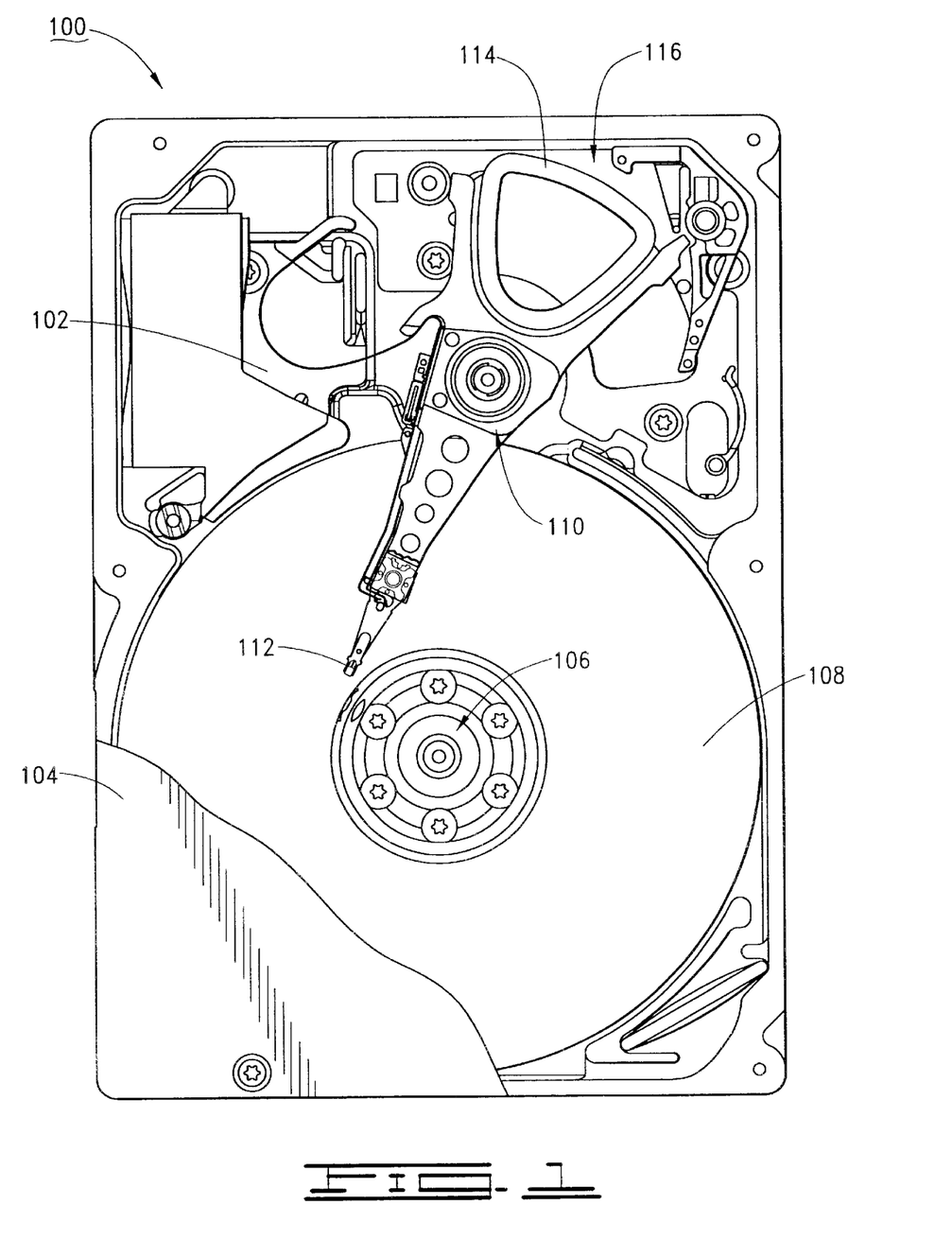
FIG. 1 is a plan view of a disc drive block data storage device constructed and operated in accordance with preferred embodiments of the present invention.

Referring now to the drawings, FIG. 1 provides a top plan view of a disc drive block data storage device 100 ("disc drive"). A base deck 102 cooperates with a top cover 104 (shown in partial cutaway) to provide a sealed housing for the drive.

Components supported within the housing include a spindle motor 106 which rotates a number of recording discs 108 at a constant high speed, and an actuator assembly 110 which supports a corresponding number of data transducing heads 112 adjacent the discs 108. The actuator assembly is rotated about an actuator axis through application of current to a coil 114 of a voice coil motor (VCM) 116. The heads 112 store data on a number of concentric tracks (not separately shown) defined on the discs 108.

Figure 2:
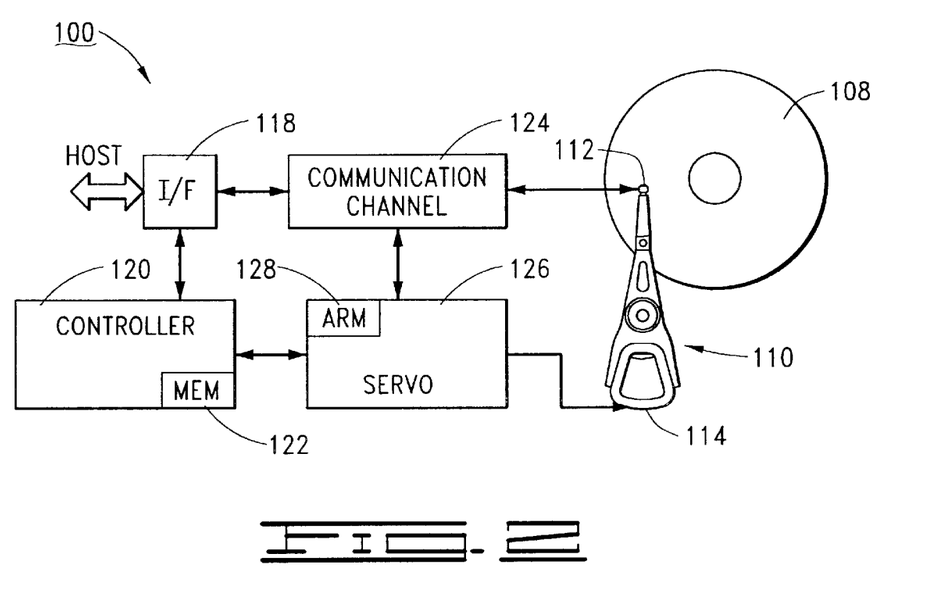
FIG. 2 is a simplified functional block diagram of the data storage device of FIG. 1.

FIG. 2 provides a simplified functional block diagram of command and control electronics of the disc drive 100. These electronics are primarily on a disc drive printed circuit board (PCB) mounted to the underside of the base deck 102, and are thus not visible in FIG. 1. A hardware based interface (I/F) circuit 118 communicates with a host device and includes a buffer to temporarily store user data during transfers between the host and the discs 108. A programmable controller (processor) 120 uses programming steps stored in an associated memory device 122 to provide top level control of the disc drive 100. As discussed in greater detail below, the memory device 122 stores platform firmware used during normal disc drive operation and diagnostic firmware used to monitor and diagnose operation of the drive.

A communications channel 124 conditions input user data to provide write signals to the heads 112 to write data to the discs 108 during a write operation and conditions readback signals transduced by the heads 112 to reconstruct user data from the discs 108 during a read operation. A servo control circuit 126 provides closed loop servo positioning control of the heads 112 and includes a programmable servo processor 128, which preferably comprises an ARM processor (Advanced Reduced-Instruction-Set-Computer (RISC) Machine).

Figure 3:
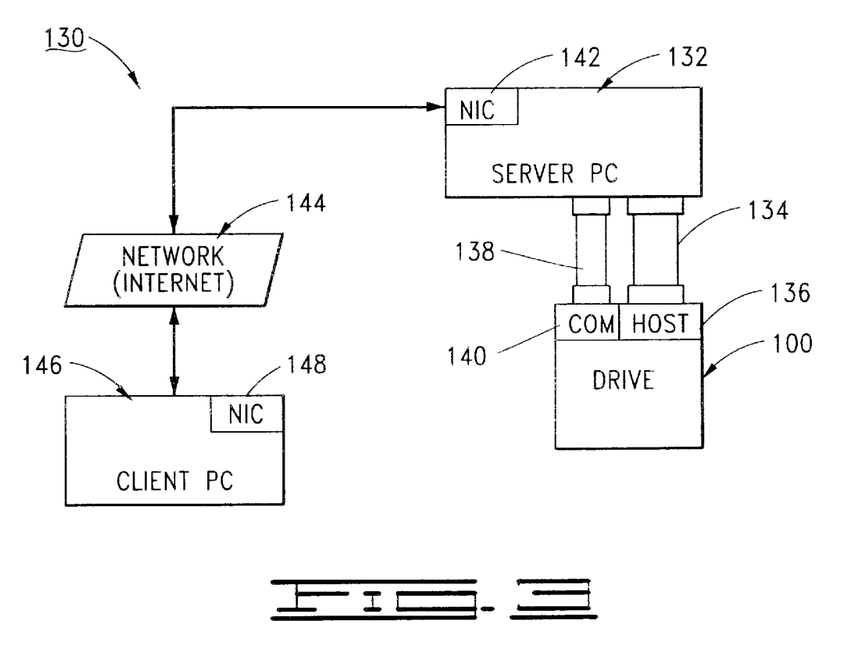
FIG. 3 is a functional block diagram of a remote access system used to remotely access diagnostic firmware on the data storage device from a remote client computer through a computer network, such as the Internet.

FIG. 3 provides a functional block diagram of a remote access system 130 constructed and operated in accordance with various preferred embodiments of the present invention. The disc drive 100 is directly connected to a first computer 132 (preferably comprising a personal computer (PC) and referred to herein as the server PC). A host interface cable 134 provides access by the server PC 132 to a host port 136 of the disc drive 100, and a serial cable 138 provides access to a universal asynchronous receiver transmitter (UART) communication (COM) port 140. It will be understood, however, that the COM port 140 can be alternatively accessed through the host interface cable 134.

The server PC 132 further includes a network interface card (NIC) 142 comprising a cable modem or similar communication device configured to enable the server PC 132 to communicate with a computer network 144. In a preferred embodiment, the computer network 144 comprises the Internet and communication is carried out using transmission control protocol/Internet protocol (TCP/IP). A second computer 146 (also preferably comprising a PC and referred to as the client PC) communicates with the network 144 via NIC 148. Various alternative approaches whereby a user can execute the diagnostic firmware of the disc drive 100 from the client PC will now be presented.

Virtual COM Port Connection

In a first approach, the interface between the server PC 132 and the disc drive 100 takes a substantially conventional configuration. That is, the diagnostic firmware is executed as appropriate commands are placed into the COM port 140 by the server PC 132. The server PC 132 in turn is loaded with specially configured software (referred to herein as Web-Comm™ software) which, as discussed below, enables the user to access the COM port using a Java compatible web browser (such as Microsoft Internet Explorer® commercially available from Microsoft Corporation).

Figure 4:
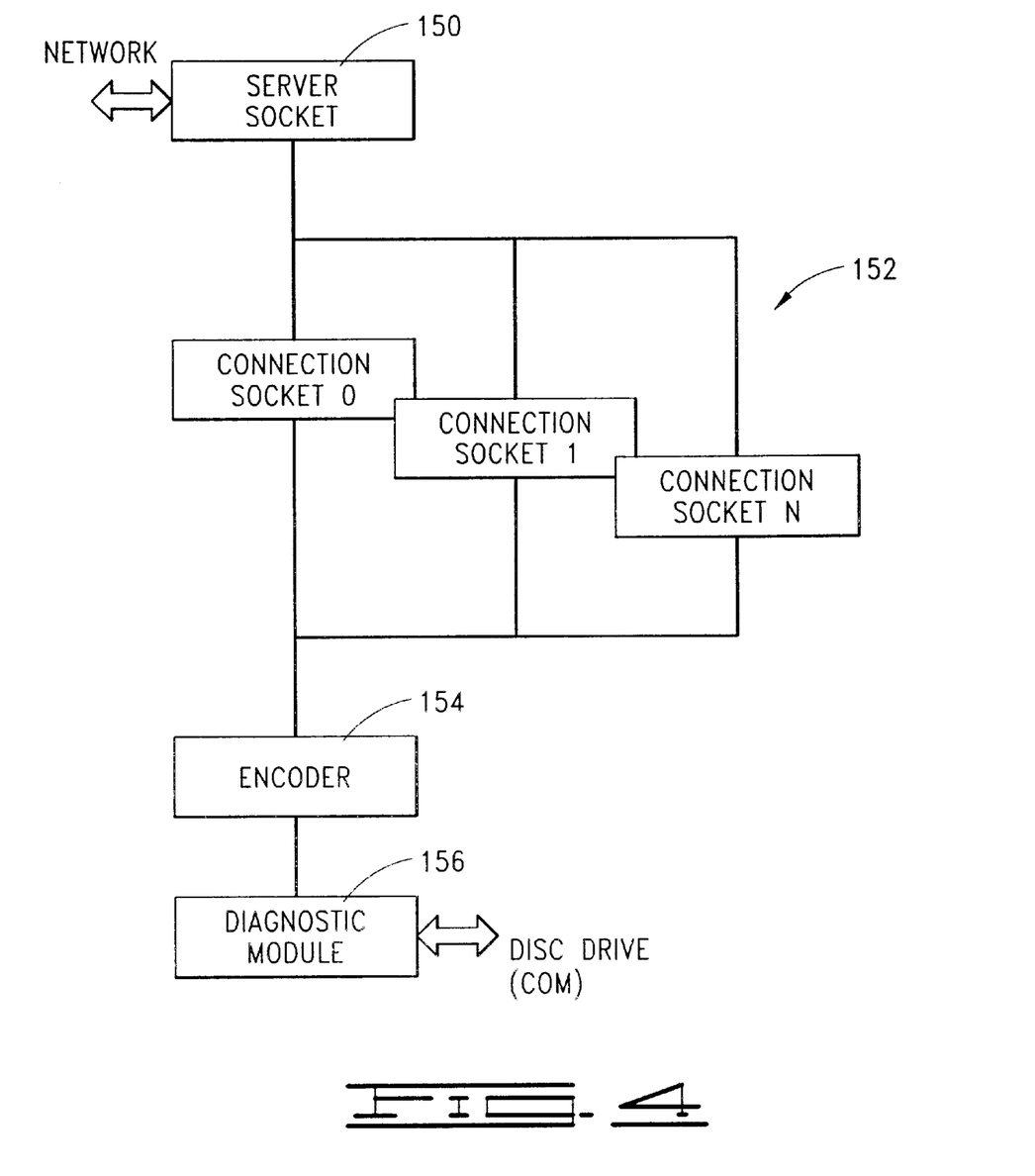
FIG. 4 generally illustrates relevant portions of server software loaded onto the server computer of FIG. 3 in accordance with a preferred embodiment.

The software has a general format as shown in FIG. 4. Commands issued by the client PC 146 and transmitted via the network 144 as a number of packets are received by a server socket block 150, which facilitates receipt of the various packets by socket connections 1 through N (represented by blocks 152). A universal resource locator (URL) encoding hash block (encoder) 154 creates a list of arguments, if any, sent by the client as a result of a user request (for example, a command entered into a script block as discussed below).

Figure 5:
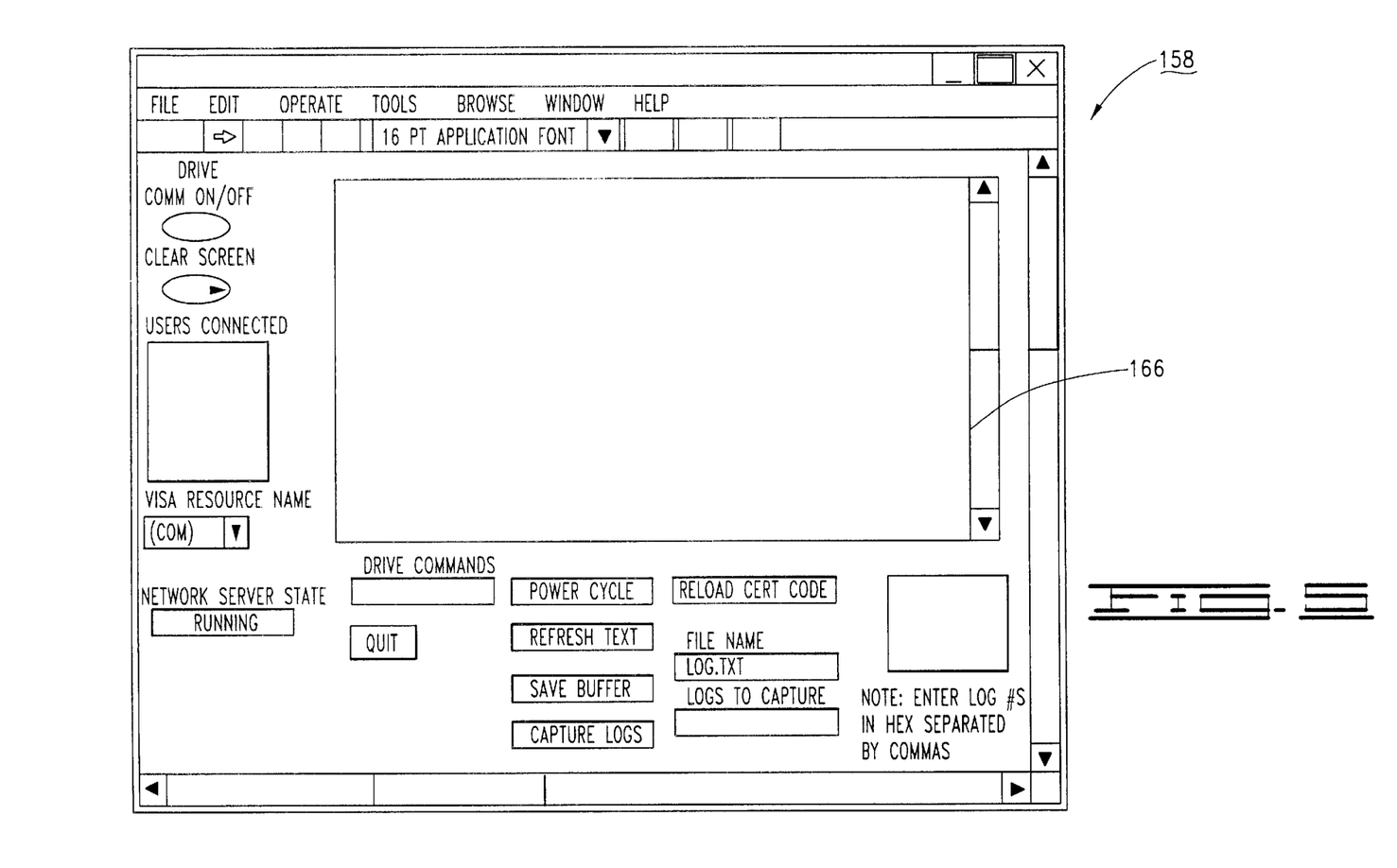
FIG. 5 represents a display viewable on the server computer of FIG. 3 using the software of FIG. 4.

The completed request is then provided to a diagnostic module 156 which translates the user request into the appropriate string that should be presented to the COM port 140 in order to execute the desired portion of the diagnostic firmware, and the module 156 transmits the string to the COM port and awaits response by the controller 120. FIG. 5 generally illustrates a display 158 viewable on a monitor at the server PC 132 and FIG. 6 generally illustrates a corresponding display 160 viewable on a monitor at the client PC 146.

The program uses a multithreaded approach so that bytes of data sent by the drive 100 are captured before more bytes are issued and erased from the port buffer. Generally, the software operates as follows. After establishing a connection using an appropriate Internet protocol (IP) address associated with the server PC 132, the user enters a command from the client PC 146 such as by entering an appropriate string in command field 162 (FIG. 6) corresponding to a desired operation by the diagnostic firmware. It should be noted that the command is not transmitted until the user hits the "enter" key. This is because the drive will typically only recognize complete commands at the COM port 140. Also, only transmitting full commands allows the user to correct data on the client PC before it is transmitted to the drive. The command is processed in accordance with the diagram of FIG. 4 and loaded into the COM port 140 for execution by the controller 120 at the next interrupt.

Since no keying or handshaking occurs between the drive 100 and the server PC 132, the software will wait for data to be returned to the COM port 140 in response to the requested action. These data are transmitted back to the client PC 148 and displayed in window 164 (FIG. 6), which provides a remote terminal display of window 166 (FIG. 5) on the server PC display 158. As desired, the user has a further option to log the data to disk. This is accomplished by typing a filename in a log file (such as by field 168, FIG. 6) and pressing save buffer button 170. This will save the current screen data to the log file which can then be accessed through a hyperlink (172, FIG. 6) to a folder containing data files.

Figure 7:
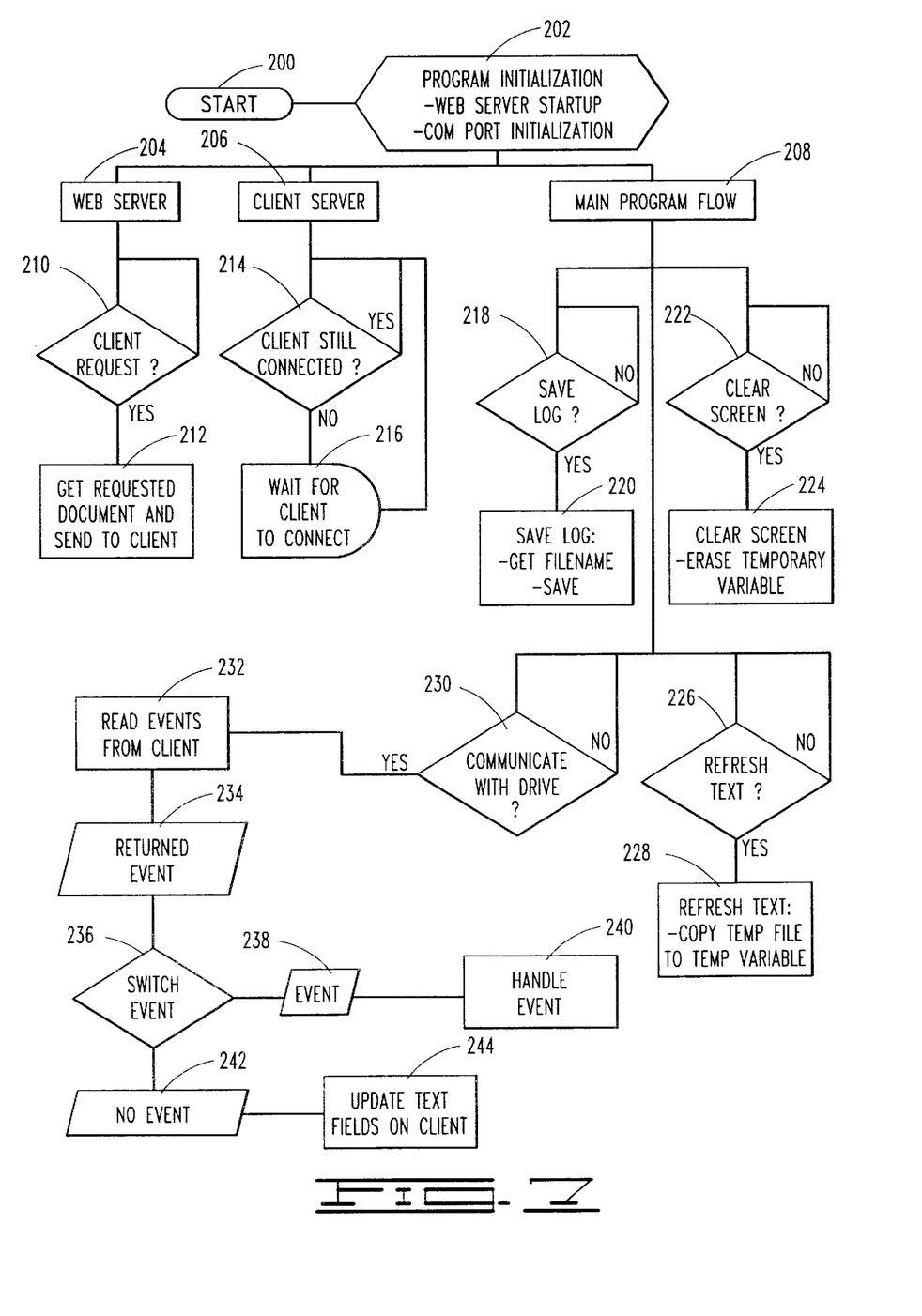
FIG. 7 is a flow chart showing a multithreaded approach taken by the software of FIGS. 4–6.

FIG. 7 provides a generalized flow chart routine 200 to represent operation of the system 130 in accordance with the present embodiment. After program initialization at step 202, respective web server, client server and main program flow routines are concurrently executed (represented respectively at steps 204, 206 and 208).

The web server path 204 generally detects client requests (decision step 210) and gets requested documents and forwards such to the client PC 146 (step 212). The client server path 206 determines whether the client PC 146 is connected (decision step 214 and wait step 216).

The main program flow path 208 includes a number of branching operations, including a save log operation (steps 218 and 220), a clear screen operation (steps 222 and 224), a refresh text operation (steps 226 and 228) and a communicate with drive operation (steps 230 through 244).

Advantages associated with the software include the fact that a standard diagnostic firmware set can be used; that is, the drive operates in a generally conventional fashion to receive and report data to the COM port 140. The knowledge required to access and operate the serial interface with the drive 100 primarily resides in the server PC 132 (i.e., the diagnostic module 156) and comprises the appropriate diagnostic toolbox used to carry out the various possible operations of the diagnostic firmware.

As desired, a higher level syntax scheme can be employed at the client PC 146 with appropriate translation by the diagnostic module 156. For example, the user can input a more human-readable command (such as "perform read command 1") and this can be translated into the appropriate hexadecimal string appropriate for the COM port 140 for execution by the controller 120.

Server on a Drive (SOAD)

An alternative approach generally involves incorporating the knowledge relating to the selection and operation of the diagnostic firmware within the drive 100 itself. In this way, the disc drive 100 operates as a server directly. As discussed below, this approach includes provision of the diagnostic firmware with a file system which recognizes file requests provided to the COM port 140 by the client PC 146. The diagnostic firmware thus preferably provides Hypertext Transfer Protocol (http) pages to the client PC 146 via the COM port 140, with such pages viewable by the client PC 146 using a suitable web browser. The drive 100 is preferably addressed using an appropriate IP address. It will be understood that other protocols such as file transfer protocol (FTP) and TelNet can be used in lieu of HTTP, as desired.

Figure 8:
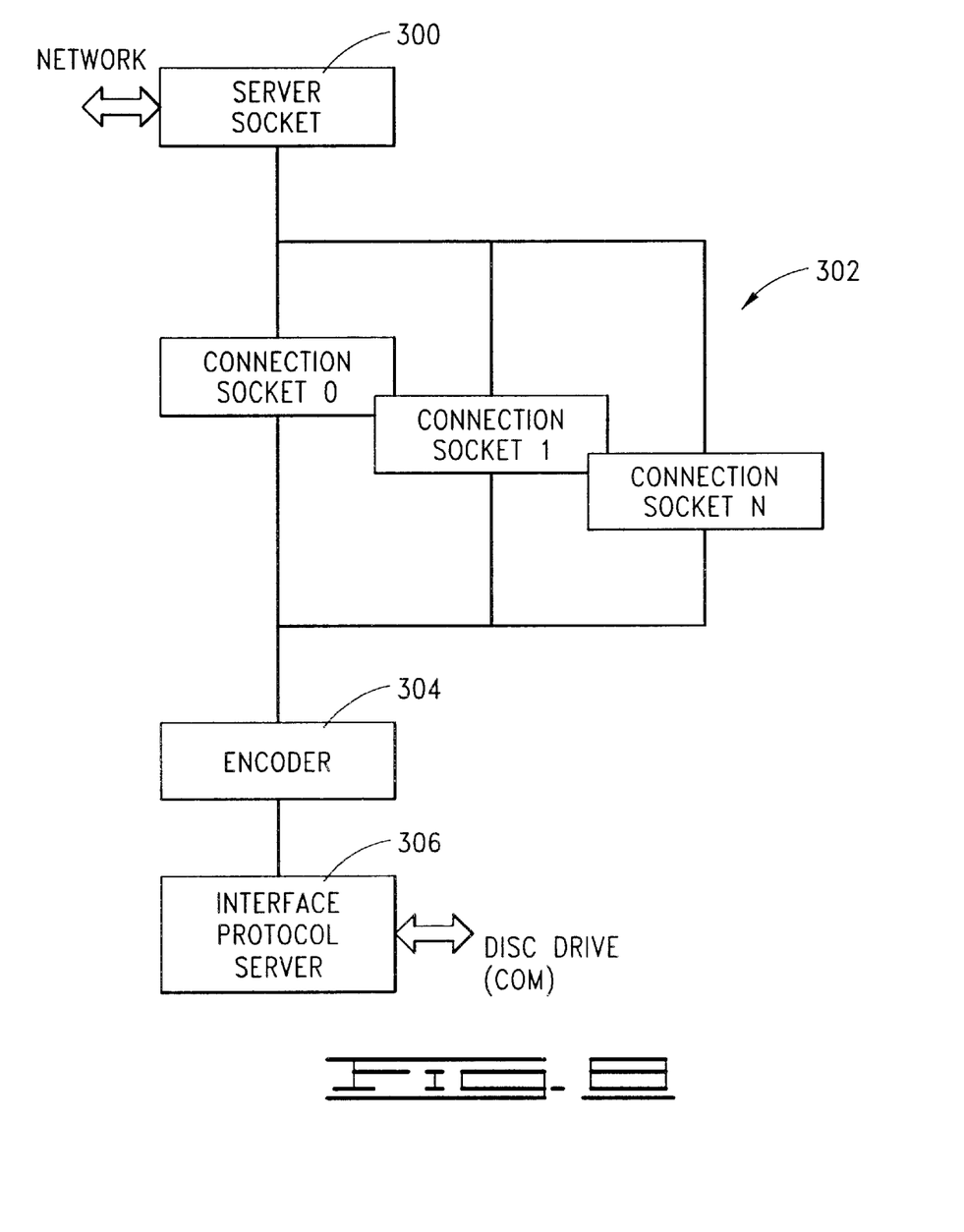
FIG. 8 generally illustrates relevant portions of server software loaded onto the server computer of FIG. 3 in accordance with an alternative preferred embodiment in which the data storage device is configured to operate as a server (server on a drive—SOAD) and includes a file system directly accessible by the client computer.

The server PC 132 still acts as a server, but primarily serves to pass requests to the drive COM port after the appropriate protocol conversion required for the particular interface used between the server PC 132 and the drive 100. FIG. 8 provides a generalized diagram of software executed by the server PC 132. It will be noted that the architecture of FIG. 8 is generally similar to that previously presented in FIG. 4.

A server socket block 300 facilitates receipt of the packets associated with a command issued by the client PC 146 and establishes socket connections 1 through N (blocks 302). A URL encoding hash block (encoder) 304 creates an argument stream which is then provided to an interface protocol server block 306 for transfer to the COM port 140.

Figure 9:
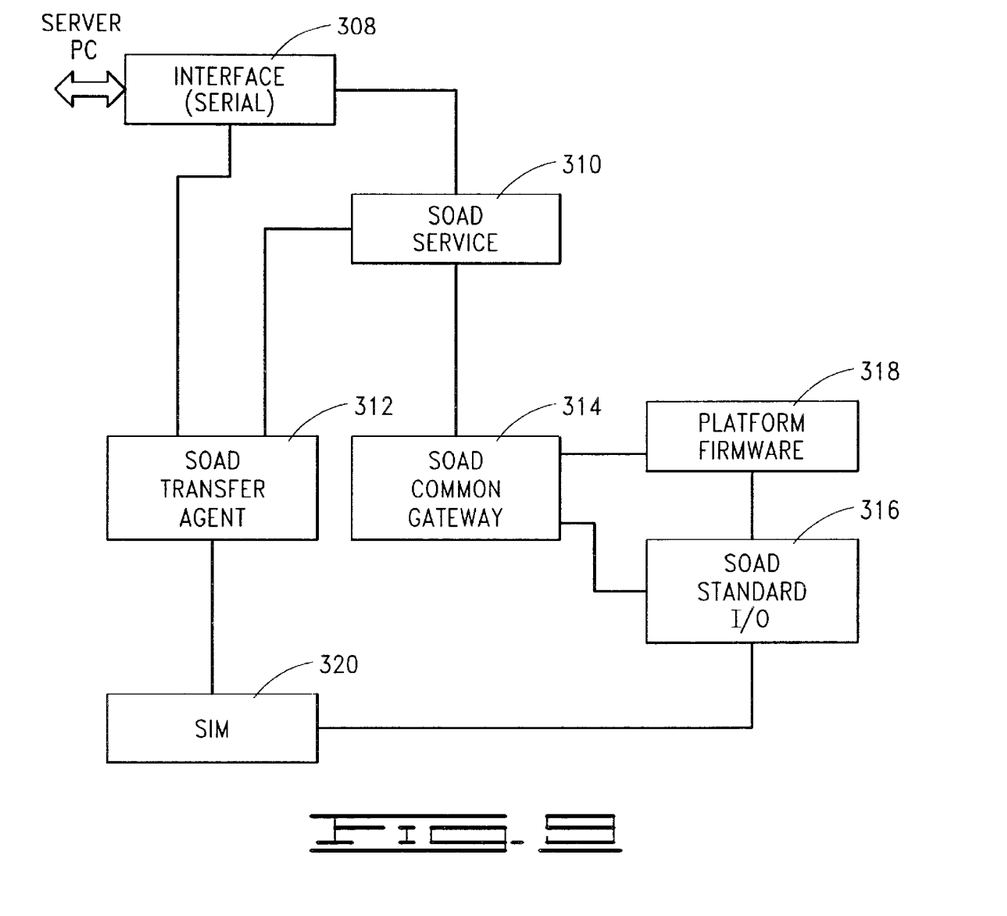
FIG. 9 generally illustrates relevant portions of the diagnostic firmware of the data storage device operated in conjunction with the software of FIG. 8.

FIG. 9 provides a functional block diagram of the SOAD architecture of the disc drive 100. The various components shown in FIG. 9 are incorporated into the diagnostic firmware and are discussed in greater detail below.

An interface block 308 receives client requests from the interface protocol server block 306 (FIG. 8), and passes the same to a SOAD service block 310. The SOAD service block 310 operates as the primary entry point for requests for SOAD related services, including threading (i.e., pulling requests into a coherent structure).

A SOAD transfer agent block 312 performs file chunking (i.e., breaking larger files into smaller pieces and transferring each piece in turn). A SOAD common gateway interface (CGI) block 314 facilitates remote procedure calls. A SOAD standard I/O block 316 allows formatted data to be generated and attached to one of several supported streams. The standard I/O block 316 is also used by the CGI block 314 to generate hypertext markup language (HTML) formatted response data.

Platform firmware block 318 represents the standard operational firmware used by the controller 120 during normal operation (and which is monitored/accessed by the diagnostic firmware as desired). SIM block 320 is a system information management block.

The function interface for the SOAD service block 310 is preferably configured as: "Status SOAD_ServiceRequest (SOAD_service_struct*Service, SOAD_return_ info*ReturnInfo)." The input Service argument contains a pointer to a buffer containing the SOAD request and payload data. It also specifies the size of the buffer and the length of the buffer contents.

The SOAD_return structure contains a pointer to the results of the request and other details. Upon return from the SOAD service call, the caller expects a callback and uses the returned information to access the results. The length and format of the result is application dependent.

The interface block 308 will normally use the SOAD transfer buffer and supports a chunking transfer. Depending upon the amount of data transferred from the serial interface, the serial port client might call this function multiple times for a single transaction to transfer the entire request. Since the SOAD runs in its own thread, a call to SOAD_ ServiceRequest( ) will typically result in a thread context transition.

Unlike host interface transfers, in many cases the firmware will have inadequate space to buffer the requested file in its entirety. Thus, in order to provide transfer of file with arbitrary sizes, the transfer is broken into a series of smaller transfers. The default maximum transfer size is constrained by the size of a public disc volume cluster size. This simplifies the solution considerably since one maximum sized chunk will exactly fit into a disc cluster. This provides the firmware with the ability to transfer chunks to disc on a one chunk to one cluster basis. In the case of firmware upload (such as a new version of platform firmware 318), there is no buffer limitation and the SOAD transfer buffer is not used. Firmware upload over the serial port will be chunked, but the destination file—the buffer, is reserved for the upload process.

The following series of steps generally describes a service call.

1) The Client PC 146 copies request data into a buffer and calls SOAD_ServiceRequest( ).
2) SOAD_ServiceRequest( ) moves the call arguments into an internal structure and POSTs to the SOAD thread.
3) When activated, the SOAD transfer agent 312 calls SOAD_Service( ) to parse and processes the request using the request structure.
4) If the entire request and payload are contained in the initial call, then the request is processed and a callback is made to the requestor.
5) If the entire request is not contained in the initial request call, after SOAD has dispatched the initial payload, the requester will receive a callback indicating SOAD is ready for the next request transfer.
6) If the results cannot be entirely fit into a results structure, SOAD will return as much of the payload as possible and make a callback to the requester. SOAD will then sleep until the requester again calls SOAD_ Service to request the next transfer chunk.

The SOAD transfer agent 312 manages stream transfers. A stream is a data structure that describes the details of a client transfer request. For example, a request for transfer of standard I/O writes to public disc cannot be accomplished directly but must pass through a buffer before a disc access is possible. The stream structure maintains particulars for a given request and the state of the system for a series of transfers.

The transfer agent 312 is thus the locus of the SOAD thread and as such responds to events and sleeps when no activity is underway. Common gateway functions are permitted to use the SOAD thread in any manner desired. The standard I/O block 316 uses the transfer agent stream handling to direct data to correct destination and to provide system breakpoints and event triggering services. Diagnostic serial port connections are managed as streams and support serial port data chunking and streaming I/O.

Figure 10:
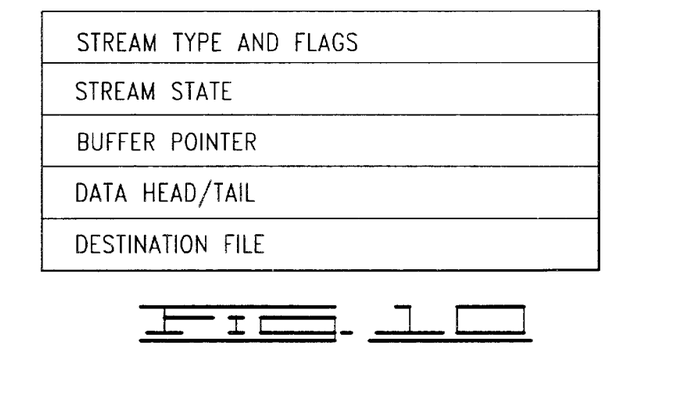
FIG. 10 shows the general format for a stream object.

FIG. 10 illustrates the general structure of a stream object. A stream object maintains the identity of a stream buffer, the location and quantity of valid data within the buffer, the state of the stream and the type of stream. Stream types include formatted data to buffer (PrintF facility), unformatted data to/from buffer (binary data), formatted data to disc (PrintF facility), unformatted data to/from disc (binary data) and formatted data to serial port (PrintF facility).

Figure 11:
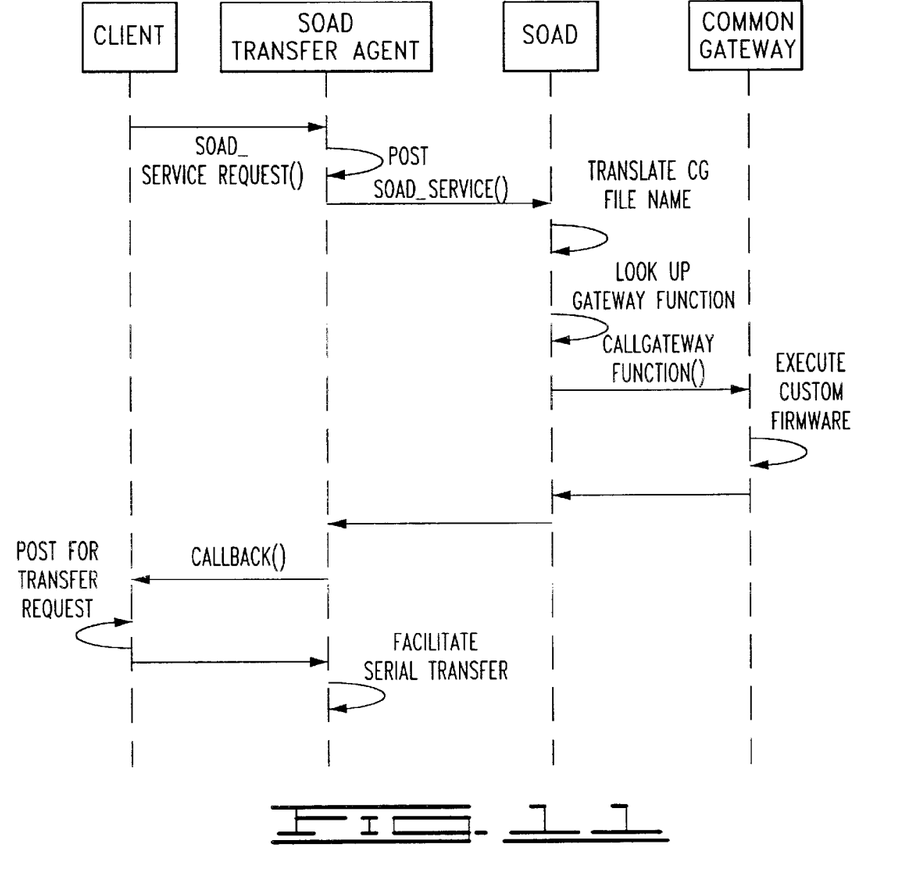
FIG. 11 provides a generalized timing diagram to illustrate the manner in which a request is handled by the diagnostic firmware of FIG. 9.

The CGI block 314 provides a simple way to insert custom firmware into the SOAD implementation. Common gateway functions can be called from the Internet and provide a hook for customizing SOAD behavior. FIG. 11 illustrates a typical sequence whereby an arbitrary common gateway function is called from the client PC 146. To create a common gateway function, a designer generally need only perform two steps. First, code is generated to perform whatever operations are required. This code is inserted into an existing empty common gateway entry. An entry in this case is a case statement in the common gateway switch statement. Second, the text name of the function is listed in the common gateway name table. After compiling the code, the functionality entered into the SOAD switch statement is available from any interface supporting SOAD.

The standard I/O block 316 uses a "printf" facility to transfer formatted data into a stream. By default the invocation of printf inserts formatted into a standard IO buffer and when the buffer reaches a predetermined trigger point, writes the buffer contents to a standard 10 disc file. The disc file resides on the public disc volume. If the default mechanism is not desired, the facility supports predefined and custom stream definition. The two PrintF( ) functional API's are PrintF(<format>, <list>)—This format resembles the familiar C standard 10 library version of printf( ). The default behavior is to transfer formatted data to disc; and PrintF(<stream>, <format>, <list>)—This format includes a stream argument. This argument can either be a SOAD predefined stream or a custom user defined stream. DOAD predefined streams include stream to serial port and stream to buffer. The printf facility advantageously allows the generation of a formatted output during firmware execution to support debug and analysis.

The SOAD protocol imposes no limits on the sizes of the requested files. In the case of unrestricted streaming, the size is unknown and is assumed to be infinite. Unrestricted streaming is useful in cases where the Platform standard I/O facility is used to dump formatted data to the client from debug statements imbedded in firmware. All transfers are made as one or more fixed frame size data packets. The size of the maximum packet is constrained by the size of a public disc volume cluster. A cluster is computed as N system blocks. The system block size is typically 512 bytes. Currently, a cluster size is defined to be 32 system blocks so the cluster size is 16K bytes.

Figure 12:
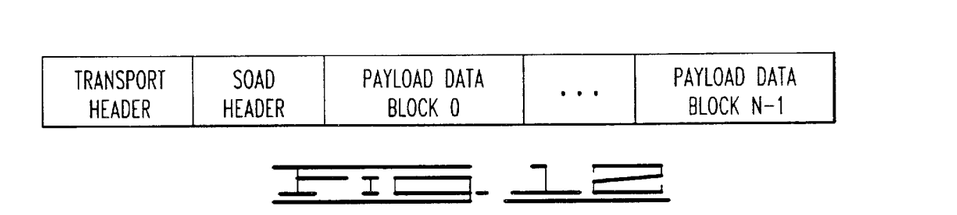
FIG. 12 is a general format for a communication to the firmware of FIG. 9.
Figure 13:
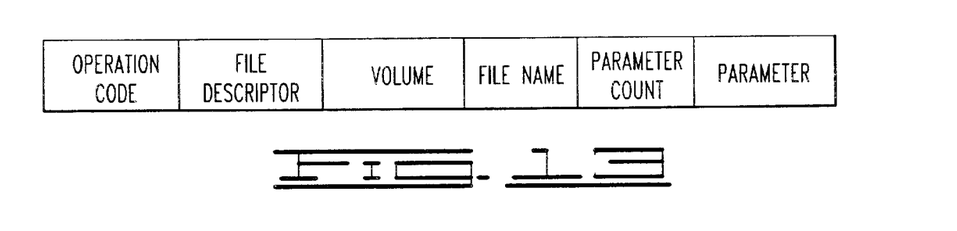
FIG. 13 shows a general format for a SOAD header field of FIG. 12.

A preferred packet frame structure is set forth by FIG. 12. The transport header is application dependent. In the case of serial bus transfer the transport header is the length of the entire frame. The SOAD header contains fields that describe the requested SOAD operation along with operation parameters. These fields are illustrated in FIG. 13 and are described as follows.

The operation code defines the requested SOAD service. Values currently defined include OP_GET and OP_SET. A get operation retrieves a requested file or executes the application indicated in the file name field. The set operation writes the file indicated in the file name field. Firmware download is an example of an operation supported by the SET.

The file descriptor value is optional. If the value is valid, the file descriptor value will be used instead of the file name and volume fields to identify the requested file. The volume field identifies the volume on which the requested file resides. The file name field is a sixteen-character null terminated string variable that contains the name of the requested file. The server will look the name in a translation table to resolve the file descriptor value. The parameter count field contains a value representing the number of thirty-two bit words that follows the count. Parameters are application specific values passed by the client to the SOAD firmware. The parameters field is a variable length list of parameters specified by the SOAD client. The parameters are passed to the identified SOAD firmware service.

Figure 14:
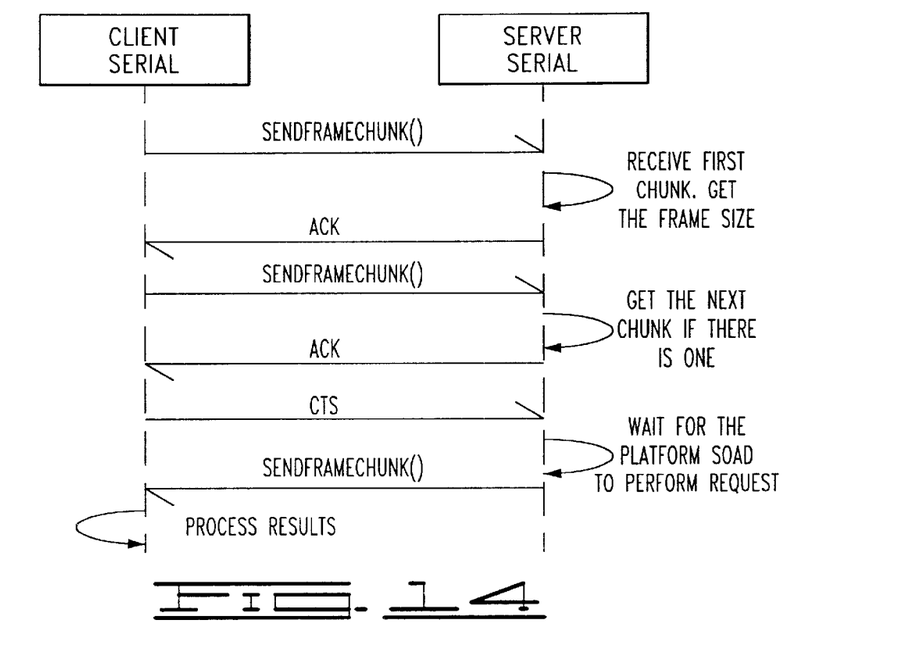
FIG. 14 generally illustrates top level communication between the client computer and the firmware of FIG. 9.

A serial transfer is accomplished by using a simple handshake between the client and the server. The client initiates a transmission by sending a transport header, a SOAD header and optionally, a payload. In order to synchronize the transfer, the serial ports use a simple handshake protocol. This protocol is illustrated by FIG. 14.

The serial transfer is not dependent upon the cluster size of the SOAD system and so a chunk might span more than one cluster. The decoupling of the internal cluster limitation in the firmware SOAD implementation is meant to insulate the transfer mechanism from physical constraints within the firmware system. To avoid overruns in upstream transfers (client to SOAD firmware) the SOAD itself manages the serial transfer. This will typically not be necessary for host interface transfers since adequate buffer space is assumed and a size constrained SOAD transfer buffer is not used.

The SOAD transfer agent 312 on behalf of the serial port performs each part of a multi-part request. The typical SOAD client to SOAD firmware server over the serial port is described below.

1) A SOAD request frame is transferred over the serial port to the SOAD service 310. The maximum transfer length is one public disc cluster size. If a longer transfer length is required the chunking is used to transmit multiple packets.

2) The service 310 accepts a number of bytes and writes them into SOAD transfer buffer (based on the specified stream). Serial transfers are made within an interrupt context.

3) When either all bytes have been transferred or the transfer buffer has filled, a POST is made to the SOAD transfer agent 312.

4) The SOAD transfer agent 312 determines if this is a new request or a continuance of an ongoing transfer. If new, then the SOAD header is interrogated. If not new, then the transfer agent 312 calls SOAD_Service with a pointer to the data stream.

5) The SOAD_Service( ) method will determine, based upon its state, how to proceed.

6) After SOAD_Service( ) has completed all activity for the request, a resulting stream is passed to the SOAD transfer agent 312. The transfer agent then manages transfer of the results back to the client.

To summarize, it will be recognized based on the foregoing discussion that the SOAD implementation operates to convert an external web request to an internal request serviceable by the controller 120. This is accomplished by building a standardized frame, or packet set, that provides context information such as that expected in a header, as well as raw data.

Figure 15:
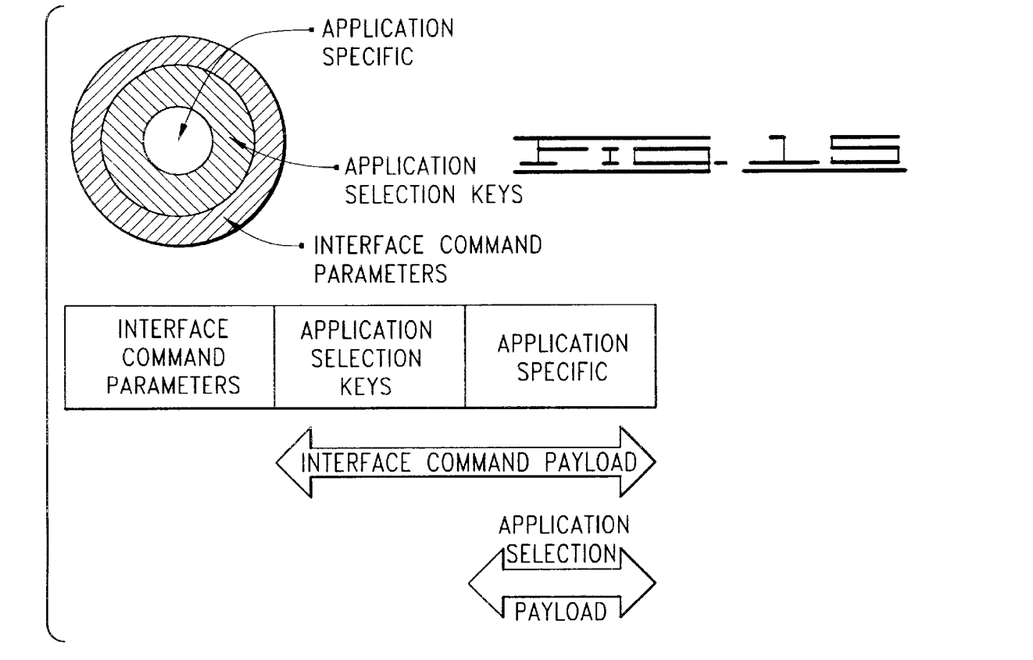
FIG. 15 generally illustrates the layered command approach used with the firmware of FIG. 9.

The Internet uses a scheme referred to as modeless data transfer whereby information is transmitted as a packet constructed as a set of layers. From outside to inside, the packet layers are decreasingly hardware dependent. FIG. 15 generally illustrates this approach.

The rings in FIG. 15 generally illustrate the concept of encapsulating the data used by each management layer during information transport. The rectangular illustration shows how this encapsulation is accomplished using data frames or packets. To construct a packet, the information is added from the inside out. That is, first the application specific information is created, and then this becomes a payload for the application selection packet, which in turn becomes a payload for the interface command parameters packet, etc.

The value provided by this approach is that a modeless communication protocol can be implemented. What this means is that there are few, if any, required dependencies on one layer's knowledge of another layer's current state. The application layer is not influenced by how the information is transferred or the state of the information at any given time, for example. So the packets can be broken up, rearranged, sent out of order, etc., and the application is not affected. The enumerated states of the application can then be fairly simple—idle, waiting for data, processing data, for example. On the other hand, if the application is involved in the transfer mechanics of the data, more states will be required and if the transfer mechanism changes, so will the application.

An advantage of the SOAD approach relates to the state information in the particular data packets employed—such information relives each layer from the chore of maintaining detailed communications with other layers about the current state of each packet. The data find their own way without much help from the implementation. In fact, new layers can be added or existing layers can be deleted without then having to modify adjacent layers.

Figure 16:
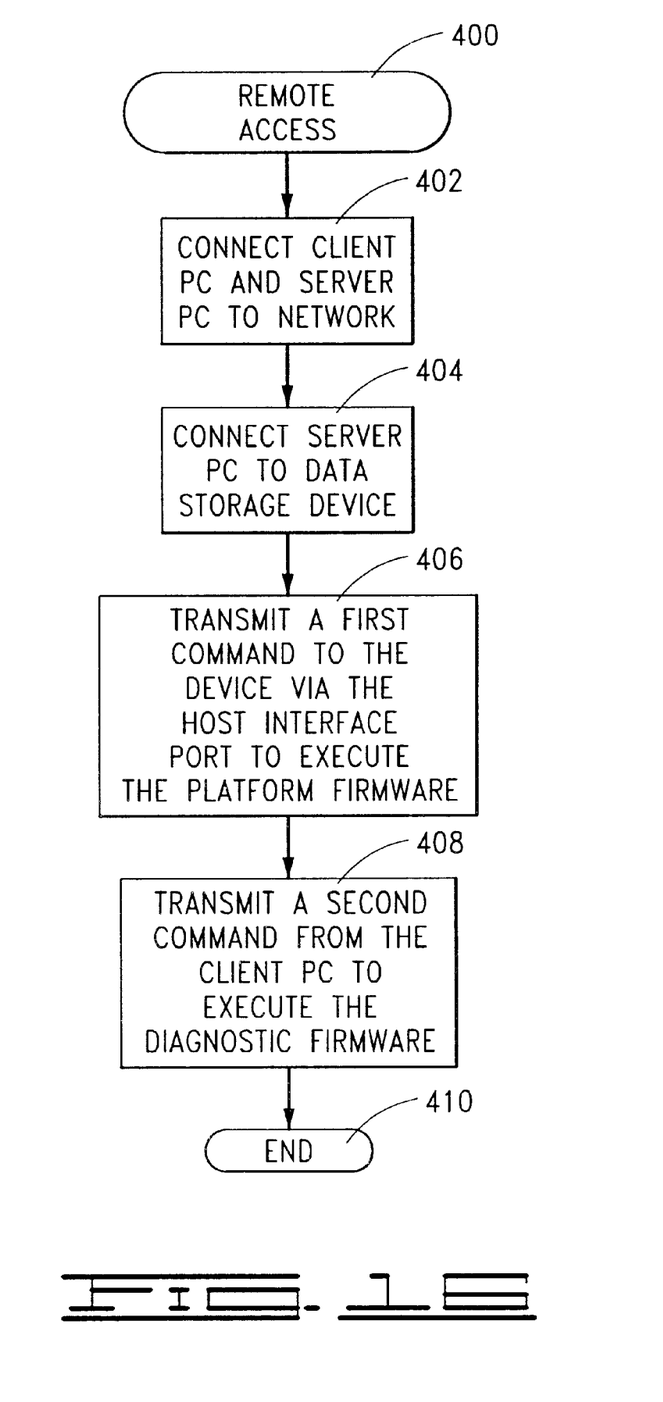
FIG. 16 provides a flow chart for a REMOTE ACCESS routine which summarizes common steps taken in accordance with the various preferred embodiments presented herein to remotely access diagnostic firmware on the data storage device.

FIG. 16 provides a flow chart for a REMOTE ACCESS routine 400, generally illustrative of steps carried out in accordance with the various preferred embodiments of the present invention discussed above to remotely access a data storage device such as the disc drive 100. At step 402, the server PC 132 and the client PC 146 are connected through the computer network 144 (preferably comprising the Internet). At step 404, the server PC 132 is directly connected to the disc drive 100 preferably as shown in FIG. 3 so that the host interface cable 134 is coupled to the host interface port 136 and the serial cable 138 is connected to the COM port 140.

The server PC 132 is then used to transmit a first command via the host interface port 136 at step 406 to execute the platform firmware to initiate normal operation of the disc drive 100. Such command may include, for example, an initialization command to initialize the disc drive 100, a write command to write data to the discs 108, a read command to read data from the discs 108, etc.

Concurrently, the client 146 transmits a second command over the computer network at step 408 to execute the diagnostic firmware. The second command is presented to the COM port 140. As discussed above, the server PC 132 can be configured with the diagnostic module 156 shown in FIG. 4 to provide the appropriate string to the COM port to cause execution of the diagnostic firmware, or the server PC 132 can be configured with the interface protocol server block 306 shown in FIG. 8 to transmit a file request to the COM port to allow the SOAD service block 310, the SOAD transfer agent 312 and the CGI 314 in the diagnostic firmware to parse and execute the command.

Returned data are provided back to the client PC 146 as desired in the various approaches discussed above. At the conclusion of the desired processing, the routine ends as shown at step 410.

It will now be understood that the present invention is generally directed to an apparatus and method for remote access of diagnostic firmware in a block data storage device. In accordance with preferred embodiments, the block data storage device comprises a disc drive (such as 100) configured to include a data storage medium (such as disc 108), a host interface port (such as 136), a serial communication (COM) port (such as 140) and a programmable controller (such as 120) with associated platform firmware and associated diagnostic firmware stored in a memory device (such as 122).

The method generally includes steps of connecting a client computer (such as client PC 146) and a server computer (such as server PC 132) through a computer network (such as 144—this step is exemplified by step 402 in FIG. 16); directly connecting the data storage device to the server computer via the host interface port (such as by step 404); using the server computer to transmit a first command to the data storage device through the host interface port to cause the controller to execute the platform firmware (such as by step 406); and using the client computer to transmit a second command to the COM port of the data storage device to cause the controller to concurrently execute the diagnostic firmware (such as by step 408). The computer network preferably comprises the Internet and communications are preferably carried out using an appropriate communications protocol, such as TCP/IP.

In a preferred embodiment, returned data are transmitted from the COM port of the data storage device to the client computer through the computer network in response to the execution of the diagnostic firmware. The returned data can include information relating to the concurrent execution of the platform firmware.

The COM port can be accessed through a main host interface cable between the server computer and the data storage device, but is preferably accessed using a separate serial interface cable (such as 138) so that the second command is transmitted via the serial interface cable. The diagnostic firmware preferably includes an executable program which is executed by the controller in response to the second command (such as a program that monitors operation of the platform firmware). The second command can also comprise a command to replace existing platform firmware with a new, updated version of platform firmware.

In a preferred approach, appropriate command translation and reporting software (such as shown in FIG. 7) having a diagnostic module (such as 308) is loaded onto the server computer and executed to generate the second command in response to a request from the client computer. In this way, the data storage device can be provided with substantially conventional diagnostic routines which are executed remotely by the client computer.

In an alternative preferred approach, the data storage device is configured as a server so that the diagnostic firmware comprises a file system comprising at least one Hypertext Transfer Protocol (HTTP) web page, and wherein the execution of the second command results in display of the at least one HTTP web page on the client computer. In this way, the server PC receives and forwards the requests from the client computer to the data storage device in a file format which is then parsed and executed directly by the diagnostic firmware of the data storage device.

It is to be understood that even though numerous characteristics and advantages of various embodiments of the present invention have been set forth in the foregoing description, together with details of the structure and function of various embodiments of the invention, this detailed description is illustrative only, and changes may be made in detail, especially in matters of structure and arrangements of parts within the principles of the present invention to the full extent indicated by the broad general meaning of the terms in which the appended claims are expressed. For example, the particular elements may vary depending on the particular application without departing from the spirit and scope of the present invention.

In addition, although the embodiments described herein are directed to the remote access of diagnostic firmware in a disc drive, it will be appreciated by those skilled in the art that the process can be used in other types of data storage devices without departing from the spirit and scope of the claimed invention.

What is claimed is:

1. A method for diagnosing a remote block data storage device having a data storage medium, a host interface port, a serial communication (COM) port and a programmable controller with associated platform firmware and associated diagnostic firmware, the method comprising:

connecting a client computer and a server computer through a computer network;

directly connecting the data storage device to the server computer via the host interface port;

using the server computer to transmit a first command to the data storage device through the host interface port to cause the controller to execute the platform firmware; and using the client computer to transmit a second command to the COM port of the data storage device to cause the controller to concurrently execute the diagnostic firmware.

2. The method of claim 1, further comprising transmitting data from the COM port of the data storage device to the client computer through the computer network in response to the execution of the diagnostic firmware.

3. The method of claim 2, wherein the data transmitted from the COM port of the data storage device comprises information relating to the concurrent execution of the platform firmware.

4. The method of claim 1, further comprising additionally connecting the data storage device to the first computer via a serial interface cable in communication with the COM port, and transmitting the second command via the serial interface cable.

5. The method of claim 1, wherein the computer network comprises the Internet.

6. The method of claim 5, wherein an Internet protocol (IP) address is associated with the data storage device, and wherein the client computer transmits the second command to the data storage device using the IP address.

7. The method of claim 1, wherein the diagnostic firmware comprises an executable program which is executed by the controller in response to the second command.

8. The method of claim 1, wherein the platform firmware is characterized as existing platform firmware and wherein the execution of the second command results in loading of updated platform firmware through the COM port to replace the existing platform firmware.

9. The method of claim 1, further comprising loading command translation and reporting software onto the server computer comprising a diagnostic module and executing said command translation and reporting software on the server computer to generate the second command in response to a request from the client computer, wherein the diagnostic module interprets the request from the client computer and provides the second command into an appropriate format for receipt and execution by the controller.

10. The method of claim 1, wherein the diagnostic firmware comprises a file system comprising at least one Hypertext Transfer Protocol (HTTP) web page, and wherein the execution of the second command results in display of the at least one HTTP web page on the client computer.

11. A method for diagnosing a remote block data storage device having a data storage medium, a host interface port, a serial communication (COM) port and a programmable controller with platform firmware and diagnostic firmware, the method comprising:
    connecting a client computer and a server computer to a computer network;
    directly connecting the data storage device to the server computer via a host interface cable in communication with the host interface port;
    loading command translation and reporting software onto the server computer;
    using the server computer to transmit a first command via the host interface cable to cause the controller to execute the platform firmware;
    using the client computer to transmit a request via the computer network to the server computer;
    executing said command translation and reporting software on the server computer to generate a second command in response to the request from the client computer; and
    transmitting the second command to the COM port of the data storage device to cause the controller to concurrently execute the diagnostic firmware.

12. The method of claim 11, further comprising transmitting data from the COM port of the data storage device to the client computer through the computer network in response to the execution of the diagnostic firmware.

13. The method of claim 12, wherein the data transmitted from the COM port of the disc storage device comprises information relating to the concurrent execution of the platform firmware.

14. The method of claim 11, further comprising additionally connecting the data storage device to the first computer via a serial interface cable in communication with the COM port, and transmitting the second command via the serial interface cable.

15. The method of claim 11, wherein the computer network comprises the Internet so that the request is transmitted by the client computer to the server computer over the Internet.

16. The method of claim 11, wherein the diagnostic firmware comprises an executable program which is executed by the controller in response to the second command.

17. A method for diagnosing a remote block data storage device having a data storage medium, a host interface port, a serial communication (COM) port and a programmable controller with platform firmware used to control transfer of data to and/or from the data storage disc, the method comprising:
    providing the data storage device with diagnostic firmware executable by the controller, said diagnostic firmware comprising a file system identifying at least one hypertext transfer protocol (HTTP) web page;
    connecting a client computer and a server computer to a computer network;
    directly connecting the data storage device to the server computer via a host interface cable in communication with the host interface port;
    using the server computer to transmit a first command via the host interface cable to cause the controller to execute the platform firmware; and
    using the client computer to transmit a second command over the computer network to the COM port of the data storage device to cause the controller to concurrently execute the diagnostic firmware and return the at least one HTTP web page to the client computer.

18. The method of claim 17, wherein the at least one HTTP web page returned to the client computer includes data relating to the concurrent execution of the platform firmware.

19. The method of claim 17, further comprising additionally connecting the data storage device to the first computer via a serial interface cable in communication with the COM port, and transmitting the second command and the at least one HTTP web page via the serial interface cable.

20. The method of claim 17, wherein the computer network comprises the Internet, wherein a selected Internet protocol (IP) address is associated with the data storage device, and wherein the client computer transmits the second command to the data storage device using the selected IP address.

21. The method of claim 17, wherein the diagnostic firmware further comprises an executable program which is executed by the controller in response to the second command.

22. A block data storage device configured to operate as a network server device, comprising:
    a data storage medium;
    communication channel circuitry configured to transfer data to and/or from the data storage medium;
    interface circuitry coupled to the communication channel circuitry and comprising a host interface port and a serial communication (COM) port; and
    a programmable controller coupled to the interface circuitry and having associated memory in which platform firmware and diagnostic firmware are stored, wherein said platform firmware comprises operational programming steps used by the controller to control the transfer of data to and/or from the data storage medium, wherein said diagnostic firmware comprises a file system which identifies a plurality of network files with at least one of said network files comprising a hypertext transfer protocol (HTTP) web page, and wherein the disc drive data storage device transmits the HTTP web page to a remote computer in response to a request provided to the COM port.

23. The data storage device of claim 22, in combination with a server computer to which the data storage device is directly coupled by a host interface cable in communication with the host interface port and a client computer coupled to the server computer through the Internet, wherein the client computer issues the request to the data storage device using an Internet protocol (IP) address associated with the data storage device, and wherein the HTTP web page is transmitted via the Internet to the client computer.

24. The data storage device of claim 22, wherein the HTTP web page includes data relating to concurrent execution of the platform firmware.

25. The data storage device of claim 22, wherein the data storage medium comprises a rigid magnetic recording disc.

* * * * *